Nov. 22, 1966              D. ATLAS              3,287,726

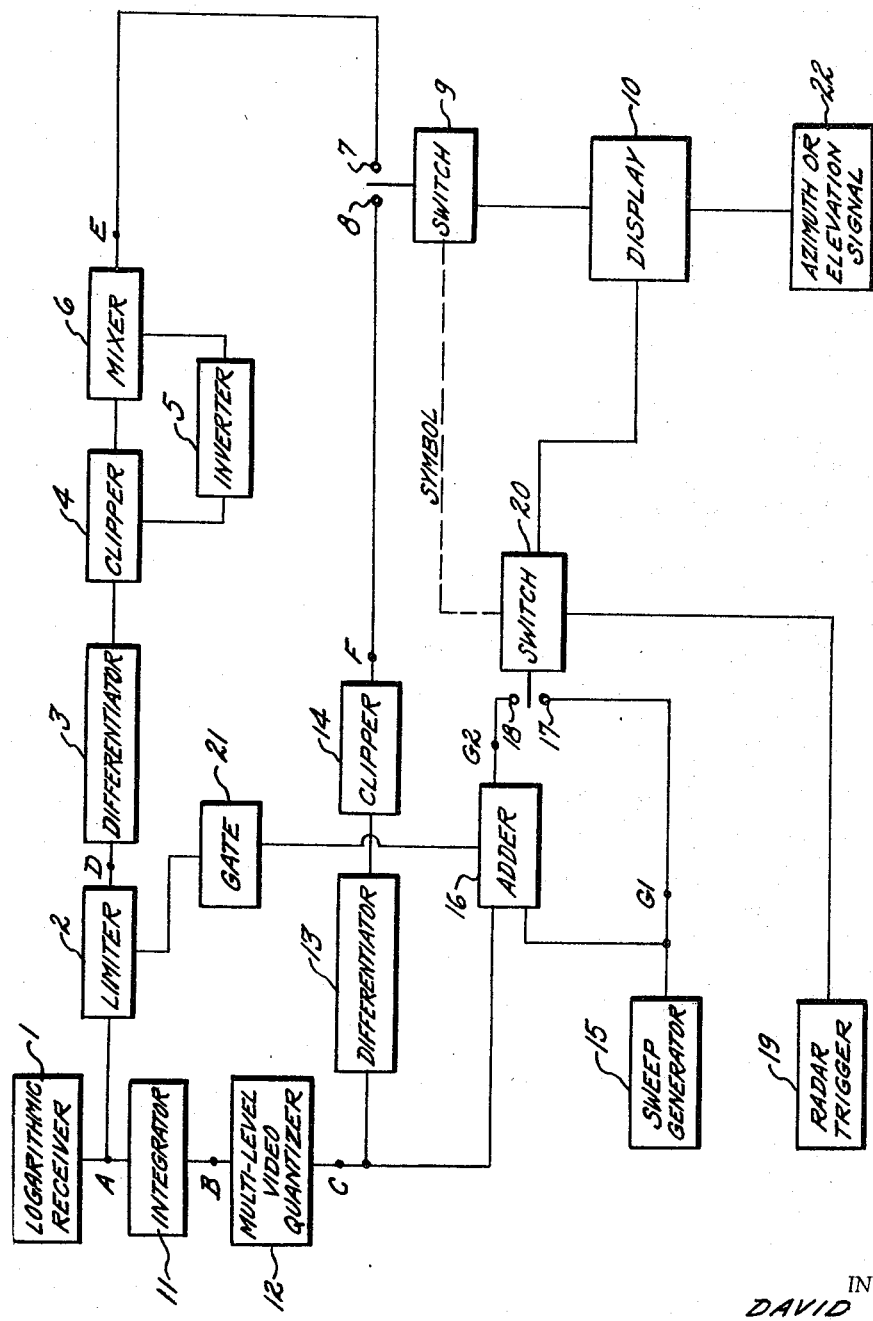

QUANTITATIVE RADAR MAPPING OF STORM ECHO MAXIMA

Filed Oct. 20, 1964                              5 Sheets-Sheet 3

INVENTOR.
DAVID ATLAS
BY Harry A. Herbert, Jr.
and Martin J. Finnegan
ATTORNEYS

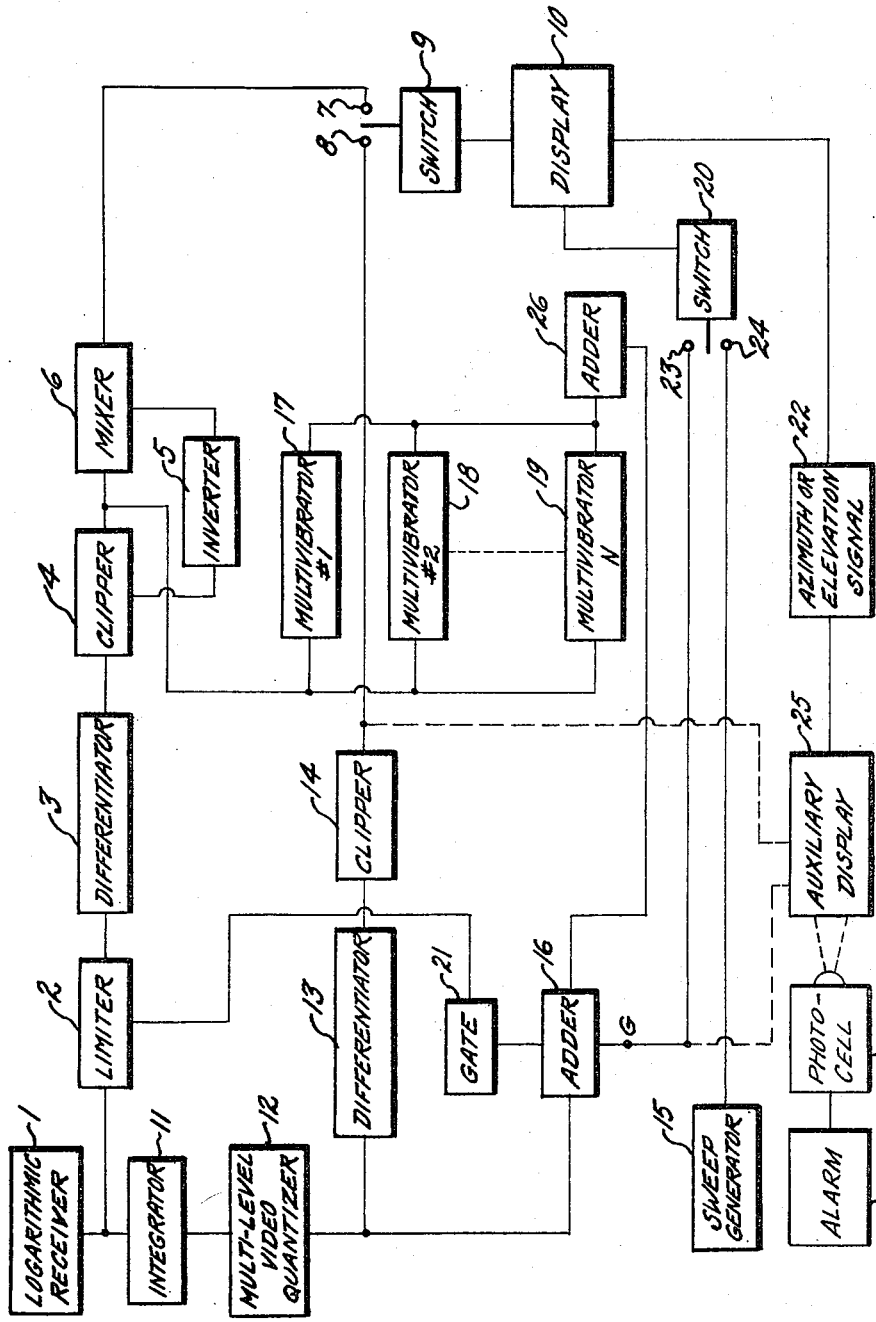

Nov. 22, 1966            D. ATLAS            3,287,726
QUANTITATIVE RADAR MAPPING OF STORM ECHO MAXIMA
Filed Oct. 20, 1964            5 Sheets-Sheet 5

INVENTOR.
DAVID ATLAS
BY Harry A. Herbert Jr.
and Martin J. Finnegan
ATTORNEYS

United States Patent Office 3,287,726
Patented Nov. 22, 1966

3,287,726
QUANTITATIVE RADAR MAPPING OF STORM ECHO MAXIMA
David Atlas, 828 Chestnut St., Waban, Mass.
Filed Oct. 20, 1964, Ser. No. 405,311
8 Claims. (Cl. 343—17.1)

The invention described herein may be manufactured and used by or for the United States Government for governmental purposes without payment to me of any royalty thereon.

This invention relates to storm detection, and particularly to the visual indication of the severity of a storm in terms of maximum reflectivity of radar detection signals along the affected area in space, to facilitate selection of the most probable direction of safe penetration by aircraft.

The inventor holds a number of patents on radar storm contour mapping devices which present contours of isopleths of constant echo intensity or reflectivity on radar indicators. In these devices the maximum intensity of the storm, as indicated by its maximum reflectivity, is determined either by sequentially increasing the threshold corresponding to a contour within the boundary of the storm until that contour disappears, or in a multi-level contour device, by counting the number of contours appearing within the storm cell. These devices suffer from a number of crucial weaknesses, such as the following:

(a) With a receiver of limited dynamic range the maximum signal level may saturate the receiver and it may not be possible to increase the contour threshold level to a point close enough to the true maximum signal. This is characteristic of presently used airborne weather radars.

(b) In multicontour devices employed with wide dynamic range receivers, the contours may be so closely packed as a result of sharp signal (or reflectivity) gradients in the storm, that it becomes difficult or impossible to identify the maximum contour level which is indicative of the peak storm intensity. Since storms may vary in reflectivity by 6 to 8 orders of magnitude and reflectivity is indicative of severity, it is crucial to identify the magnitude accurately. Also the identification must be made rapidly and in a clearly readable manner. In addition, it is desirable that the device be as simple and economical a modification to existing equipment as possible. These are the objectives of the present invention.

In the drawings:

FIG. 2a is a block diagram of circuit components that may be involved in practice of the invention;

FIG. 3a is a block diagram of a second circuit arrangement;

Figure 1A:
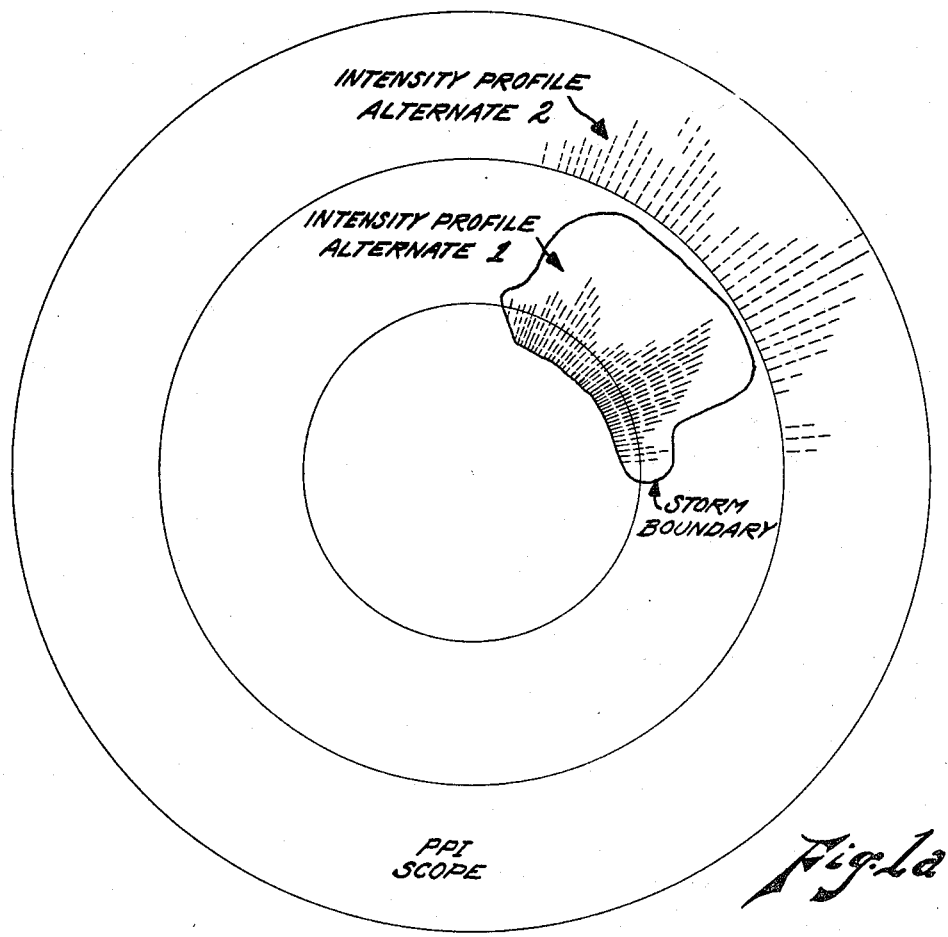
FIG. 1a is a view of two PPI types of display that are obtainable by practice of the invention.

Referring first to FIG. 1a, it will be noted that, instead of displaying the entire storm region in white (echo region) as is done at present, only the outline of the storm echo region is made to appear on the scope. This boundary signal is presented to the display on alternate radar sweeps or traces; however with normal pulse repetition rates, the boundary line appears virtually continuous (except at great ranges where it may appear as a broken curve). On every other radar sweep, the quantized signal level itself is used to displace the trace (radially in FIGURE 1) so that the number of pulses appearing along the radial sweep represents the maximum echo intensity attained within the storm in that direction.

Figure 1B:
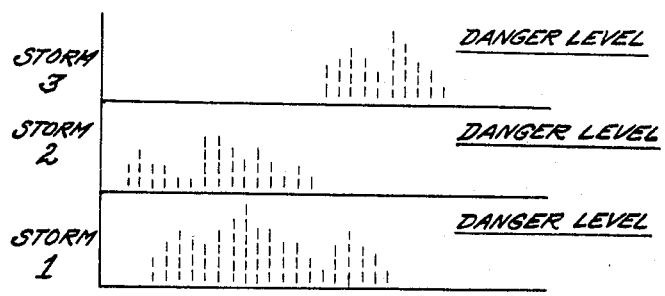
FIG. 1b is a view of a third type of display.

Various alternatives for the zero echo level reference baseline are available depending upon the objectives and justifiable complexity. In FIGURE 1 we illustrate two such alternatives. Alternate 1 utilizes the near boundary of the storm cell as the zero signal level. In this case the intensity profile is superimposed in the form of a radial bar graph on the geographical display of the storm boundary. While no great difficulty is expected in distinguishing the maximum intensity profile from the storm boundary pattern, discrimination between the two can be made foolproof by using either two discrete shades of signal brilliance on a single color display, or two different colors on a two color tube. Alternate 2 shows the profile of maximum storm intensity on the outer sector of the PPI scope using a fixed radius as the base line for zero signal level. Alternate 1 is preferable to 2 if more than one storm appears along the same azimuth since it is possible to present the intensity profiles for each storm essentially within the storm boundary. In alternate 2, it would be necessary to reserve a torus of the outer region of the scope for each storm which appears along the same direction. Of course, it is possible to utilize a separate display for the intensity profiles of alternate 2 as illustrated in FIGURE 1b. In this case, the intensity profile for each storm would appear as a distinct bar graph.

Figure 2B:
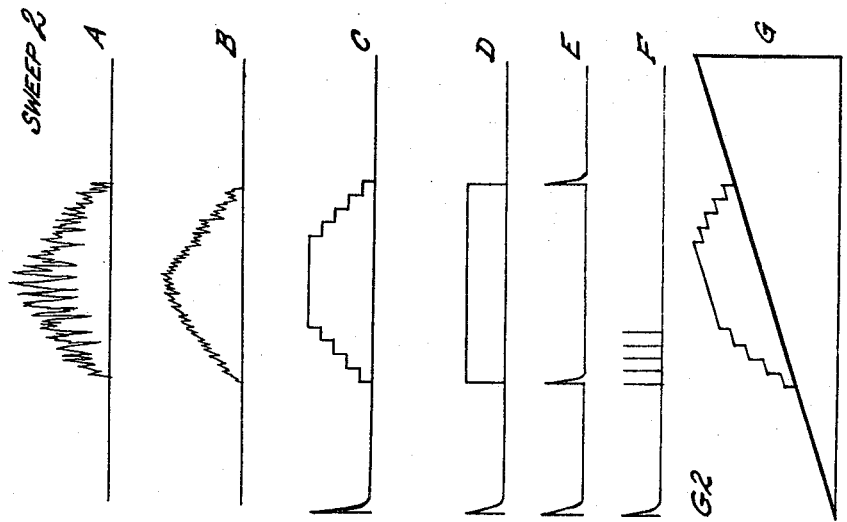
FIG. 2b illustrates the wave and pulse forms derived at successive stages of the signal processing cycle.
Figure 2B:
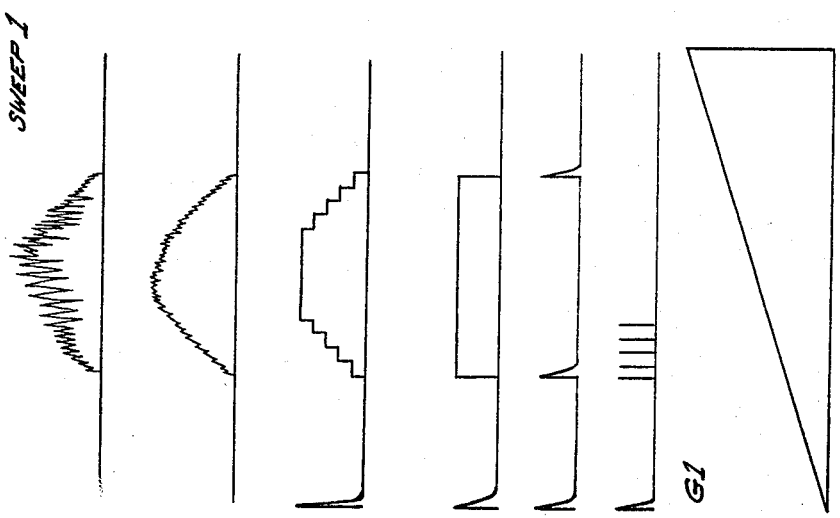

One possible version of the circuitry required to produce the alternate 1 display of FIGURE 1a is illustrated in FIGURE 2a with associated waveforms shown in FIGURE 2b. The points at which the waveforms of FIGURE 2b are located are marked by symbols corresponding to the waveforms. The system assumes the use of a receiver of wide dynamic range equal to the range of interest to be mapped; this may be a logarithmic receiver 1 whose output is shown by waveform A. It is also assumed that the receiver is range normalized if it is desired to map true storm reflectivity; otherwise the profile represents echo intensity. To map the storm boundary, the receiver output A is passed to limiter 2 which goes to saturation as soon as signal appears above its threshold, producing rectangular waveform D. This signal is operated upon by differentiator 3, clipper 4, inverter 5, and mixer 6 to produce positive going pulses such as waveform E corresponding to the leading and trailing edges of the storm. During sweeps 1, 3, 5, etc., or other suitable alternation period, waveform E is applied to the signal (intensifier) grid of the display 10 through electronic switch 9 as in the case of normal radar signals.

During even numbered sweeps (pulse periods) the display switches to the intensity profile mode. In this mode, the receiver output signal A is passed through integrator 11 to produce smoothing of the noise like fluctuations as shown by waveform B. Signal B is then passed through a multilevel video quantizer 12 to produce the stepped waveform C, each step corresponding to a preset class of signal intensities. At a point corresponding to the near boundary of the storm, the output of limiter 2 operates gate 21 which causes adder 16 to add the stepped waveform C to the sawtooth deflection voltage, typically as shown by waveform G1, which is the output of sweep generator 15. The sum waveform G2 is passed through contact 18 of electronic switch 20 as the sweep deflection signal for display 10. Thus, once the storm boundary is reached, the sweep is being moved from its normal position (radial on a PPI scope) by an amount proportional to the signal level. In order to illuminate the display stepped waveform C is passed through differentiator 13 and clipper 14 to produce positive pulses such as F at points corresponding to the rise of each step. The negative pulses corresponding to the falling steps are blocked by clipper 14. The positive pulses (F) are then applied through contact 8 of electronic switch 9 to the signal grid of display 10. In this manner the sweep is made visible by a series of dots occurring at positions displaced from the leading edge of the storm according to the intensity reached by the stepped waveform. As the radar beam scans in azimuth (or elevation) the display beam is moved by the azimuth (or elevation) signal 22, and switches 9 and 20, operated synchronously from radar trigger 19, cause the storm boundary signal and the storm intensity signal to be displayed alternately. Azimuth (or elevation) signal 22 is provided in the conventional manner wherein as the aforementioned radar beam scans in azimuth (or elevation), a corresponding azimuth (or elevation signal) is obtained thereby as more specifically described at pages 7–16 of Principles of Radar (3rd edition) by Reintjes and Coate, published 1952 by McGraw Hill Book Company, Inc. To distinguish the two profiles, it is apparent that waveform F, the output of clipper 14, may be made more intense than waveform E, the storm boundary pulses. Alternatively, a two color tube may be used and the colors switched in synchronism with switches 9 and 20. Also, it is evident that the scale of the intensity profile may be altered at will be amplifying or attenuating waveform C which becomes the added sweep deflection signal on alternate sweeps.

Figure 3B:
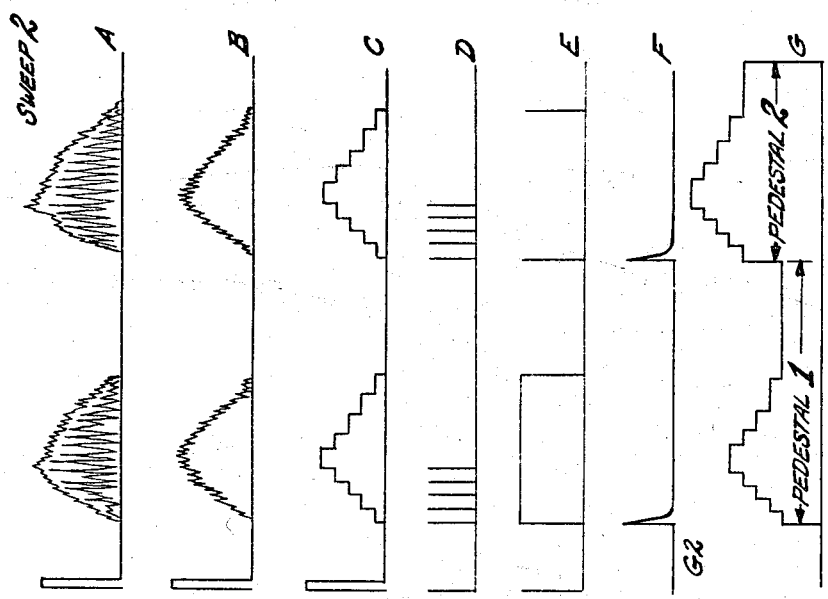
FIG. 3b illustrates the wave and pulse forms at successive stages of the FIG. 3a operation.
Figure 3B:
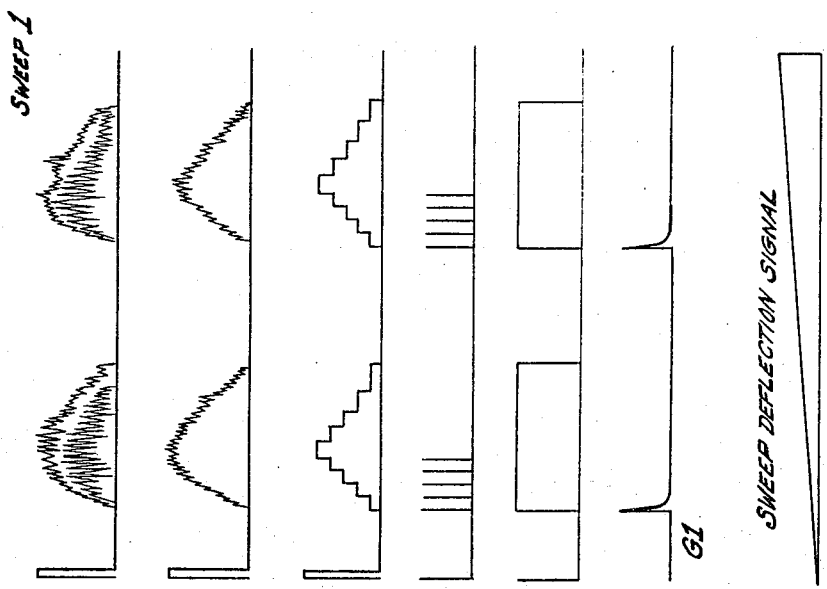

In order to produce the alternate 2 intensity profile display in the outer sector of the display as shown in FIGURE 1a, or on the auxiliary display as shown in FIGURE 1b, use may be made of circuitry such as that illustrated in FIGURE 3a. In this case the storm boundary mapping mode operates as in the previous case when switch 9 is at contact 7 during radar sweeps 1, 3, 5, etc. During alternate sweeps 2, 4, 6, etc., however, the leading edge pulse for storm #1, waveform E in FIGURE 3b, triggers multivibrator #1 (17) to produce the base pedestal #1 in waveform G in FIGURE 3b. If there is a second storm along the same direction, its leading edge pulse triggers multivibrator #2 (18), to produce pedestal #2 in waveform G which is superimposed on pedestal #1 in FIGURE 3b through adder 26, and so forth for N storms. At the same time, adder 16 superimposes the quantized video storm signal C of the multilevel video quantizer 12 upon the pedestal to produce the final waveform G in FIGURE 3b and this is used to drive the sweep deflection of display 10 when switch 20 is at contact 23. The positive pulses D, the output of clipper 14, corresponding to the rising steps of waveform C are then used to intensify the display when switch 9 is simultaneously at contact 8 as before. Note that during sweep 1, the boundary mapping period, the sweep deflection voltage rises to only a fraction of the maximum possible value. Thus, the storm outline is mapped within a corresponding fraction of the display area. On sweep 2, the intensity mapping cycle, storm #1 creates its own base deflection voltage (pedestal 1 of waveform G) so that the zero base line for intensity appears as a ring on the outer boundary of the mapping display. The superimposed quantized intensity signal then displaces the trace from its baseline by an amount corresponding to the signal level. Similarly a second ring on the scope is reserved for storm #2, etc. Obviously, waveforms such as G2 are available at output G of adder 16 on every sweep. Thus, they may be displayed continuously on auxiliary display 25 as indicated by the dashed connecting circuits. In this case, one coordinate of the display is driven by the azimuth (or elevation) signal 22, the other coordinate is driven by waveforms such as G2, and the signal (intensity) grid is driven by waveform D. The resulting display is schematically illustrated in FIGURE 1b.

The advantages of this system are numerous. First of all, it provides a dual display in which the profile of maximum signal intensity is displayed simultaneously as the storm regions are mapped. The intensity profile may be displayed according to various alternatives according to the specific objective and the desired clarity of presentation. In ground-based weather radars, a single antenna scan may produce a display of both the storm regions and their intensities in a quantitative manner. In airborne systems, where the pilot must avoid severe storms according to their radar reflectivity, the external or auxiliary intensity display will provide a clear easily readable profile of storm reflectivity as a function of azimuth so that he may select the direction of minimum hazard for penetration. When the intensity reaches a preset level, a hazardous situation is indicated. Such a danger level is indicated on the auxiliary display 25 as illustrated in FIGURE 1b. This level can be automatically monitored by a photocell 27 (or an equivalent threshold on the output of the multilevel video quantizer) to trigger a visual or audible alarm 28. Regardless of the use of such an alarm, the hazard warning will be unmistakable.

What I claim is:

1. In a radar weather plotting system, wherein storm cloud geometry and intensity are to be indicated on a radar screen, the combination with said radar screen of electronic signal sending and receiving means including a rotatable antenna structure for radiation and return reception of reflected signal pulses, means to generate from said return reflected pulses, pulses representative of the leading edge of said storm cloud and pulses representative of the trailing edge of said storm cloud to provide storm boundary signals, means to generate a stepped waveform from said return reflected pulses, each step corresponding to a present class of signal intensities, means to generate a sweep deflection signal for said radar screen, means to add said stepped waveform to said deflection signal at a point corresponding to said leading edge of said storm cloud, means to generate a pulse for each rise of said stepped waveform for illumination of said radar screen, said pulses representative of said rises also being representative of the intensity signals of said storm, and means to alternately display said storm bounary signals and said storm intensity signals on said radar screen.

2. The radar weather plotting system defined in claim 1, wherein said means to generate pulses representative of the leading and trailing edge of said storm cloud includes a limiter receiving said return reflected pulses, said limiter going to saturation as soon as the input signal thereto appears above its threshold providing a rectangular output signal, and means in sequence to differentiate, clip, invert, and mix said rectangular signal.

3. The method of displaying radar signals reflected from a storm cloud as a function of the angular position of the radar antenna, which method comprises the step of displaying the profile of maximum echo intensity at each antenna position, and the step of displaying the storm boundary of the storm cloud at said each antenna position by alternately plotting the maximum signal intensity and storm boundary in successive pulse periods.

4. The method of displaying radar signals reflected from a storm cloud as a function of the angular position of the radar antenna, which method comprises the step of displaying the profile of maximum echo intensity at each antenna position, and the step of displaying the storm boundary of the storm cloud at said each antenna position by alternately plotting the maximum signal intensity and the storm boundary in successive pulse periods, and the step of causing the storm boundary nearest the radar to provide a trigger to commence a sweep, the amplitude of which is determined by the maximum signal intensity obtained along the direction of viewing.

5. The method of displaying radar signals reflected from a storm cloud as a function of the angular position of the radar antenna, which method comprises the step of displaying the profile of maximum echo intensity at each antenna position, and the step of displaying the storm boundary of the storm cloud at said each antenna position by alternately plotting the maximum signal intensity in successive pulse periods, and the step of triggering an alarm whenever the maximum signal intensity and the storm boundary anywhere in the profile exceeds a preset critical level.

6. A system of obtaining and displaying on an oscilloscope a quantitative profile of the maximum radar signal reflected from a storm as a function of the angular position of the radar antenna comprising means to receive radar signals reflected from said storm, means to generate a stepped waveform signal from said received radar pulses, each step corresponding to a preset class of signal intensities, means to generate a deflection voltage for said oscilloscope, said oscilloscope having a control grid, means to add said stepped waveform signal to said deflection voltage at a point corresponding to the near boundary of said storm, and means to illuminate the display on said ocilloscope by generating pulses for each rise of said stepped waveform signal and applying said generated pulses representative of said rises to said control grid of said oscilloscope.

7. A radar weather plotting system for obtaining and displaying an oscilloscope storm geometry and intensity from radar signals reflected from a multiplicity of storms comprising means to receive said reflected radar signals, means to generate for each storm from said received signals pulses representatives of the leading and trailing edges of said storms to provide boundary signals of said storm, means to generate for each of said storms from said received signals a stepped waveform signal, each step corresponding to a preset class of signal intensities, means to generate a sweep deflection voltage for said oscilloscope, said oscilloscope also having a control grid, means to add each of said stepped waveform signals to said deflection voltage at a point corresponding to the leading edge of its associated storm, means to generate a pulse for each rise of said stepped waveform signal for application to said control grid of said oscilloscope, said pulses corresponding to said rises being representative signals of each storm intensities, and means to alternately display on said oscilloscope said boundary signals and said storm intensity signals.

8. A system as defined in claim 6 wherein said means to generate pulses representative of the leading and trailing edge of said storm includes a limiter being fed said radar signals reflected from said storm, said limiter going to saturation as soon as the input signal thereto appears above its threshold to provide a rectangular output signal, and means in sequence to differentiate, clip, invert and mix said rectangular signal.

References Cited by the Examiner
UNITED STATES PATENTS 2,786,993   3/1957   Reid _____ 343—5

CHESTER L. JUSTUS, *Primary Examiner.*

RODNEY D. BENNETT, *Examiner.*